Patented July 16, 1935

2,008,526

UNITED STATES PATENT OFFICE 2,008,520

STEAM TURBINE GLAND DIAPHRAGM PACKING

Carl R. Soderberg, Swarthmore, Pa., assignor to Westinghouse Electric & Manufacturing Company, East Pittsburgh, Pa., a corporation of Pennsylvania Application April 20, 1934, Serial No. 721,531

6 Claims. (Cl. 253—69)

My invention relates to steam turbines, more particularly of the impulse type, and it has for an object to provide an improved type of interstage packing for sealing the diaphragm with respect to the spindle.

The application of packings of the labyrinth type wherein the strips define axial clearances between turbine rotor structure and stator structure, for example, a diaphragm, and wherein the axial clearance is fixed by axial adjustment of the rotor, have not heretofore been practicable in impulse type turbines because of the deflection of the diaphragm, due to the pressure difference between one side and the other, interfering with this clearance. Accordingly, it is an object of my invention to provide packing of this character constructed and arranged to preserve suitable axial clearances even though deflection of the diaphragm may take place.

More particularly, I provide diaphragm packing which is comprised by a member carried by the rotor and radially overlapping the central annular portion of the diaphragm, the central annular portion of the diaphragm having one or more annular and axially-extending packing strips which cooperate with the member to define sealing clearance. The member carried by the rotor is constructed and arranged so that it deflects under the pressure difference existing between opposite sides of the diaphragm substantially to the same extent in an axial direction as the diaphragm, with the result that the rubbing or packing strips may be maintained in substantially constant clearance relation regardless of variations of pressure difference between one side and the other of the diaphragm.

The member carried by the rotor comprises a flanged element, the inner circumference of which is secured in steam-tight relation to the rotor. The flange element includes an outer radial portion, with which the annular packing rings cooperate, and a webbed portion, which may be curved, joining the radial portion and the rotor attachment portion to provide the desired degree of flexibility. The flange is preferably formed to provide a multiplicity of coaxial stepped lands and the central annular portion of the diaphragm is formed with corresponding lands, each land of the diaphragm being provided with an annular packing strip which cooperates with a flange land and the flange lands each being of substantial radial width so that, even though radial displacement may occur between the flange and the diaphragm, the sealing clearance will be maintained. The stepped formation of the sealing structure not only provides for a more effective seal in that the passage through the labyrinth is thereby made more tortuous, but the stepped formation stiffens the flange in all directions, whereby deflection due to the pressure difference occurs in the web, the web being constructed and arranged so that movement of the flange axially due to such deflection is substantially the same as the axial movement of the central annular portion of the diaphragm incident to deflection thereof due to the pressure difference. Furthermore, the stepped relation of lands facilitates dismantling and assembling of the apparatus. Hence, a further object of my invention is to provide apparatus of this character having these advantageous features of construction and of operation.

A further object of my invention is to provide diaphragm packing wherein the spindle is provided with a flange overlapping the central portion of the diaphragm together with one or more annular packing rings carried by the central portion of the diaphragm and cooperating with the flange to define sealing clearance.

A further object of my invention is to provide turbine diaphragm packing wherein the turbine spindle is provided with a flange which overlaps the central portion of the diaphragm, the latter being constructed and arranged to provide corresponding stepped annular lands with each diaphragm land having a packing ring cooperating with the corresponding flange land to define sealing clearance.

These and other objects are effected by my invention, as will be apparent from the following description and claims, taken in accordance with the accompanying drawing, forming a part of this application, in which:

Figure 1:
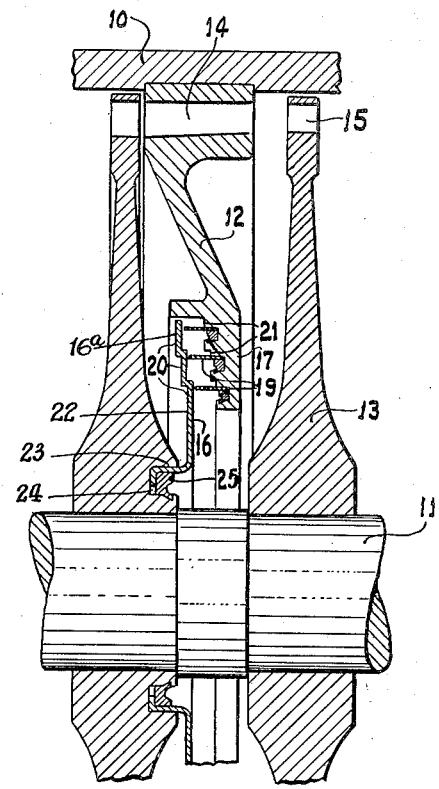
Fig. 1 is a sectional detail view of a turbine incorporating my invention.

Referring to the drawing more in detail, I show a turbine casing or cylinder 10 having a rotor or spindle 11 arranged therein, the casing having one or more diaphragms 12 which interfit with respect to blade carrying discs 13 of the rotor. Each diaphragm 12 is provided with nozzle passages 14, which cooperate with blades 15 carried by the succeeding blade-carrying discs 13 in the usual way. My invention relates to the diaphragm packing between the diaphragm and the spindle.

My improved diaphragm packing preferably comprises a ring member 16 carried by the rotor and having an outer annular radial sealing portion 16a which radially overlaps the central annular sealing portion 17 of the diaphragm 12. One or more annular rubbing or sealing strips 19 are carried by one of the sealing portions, for example by the central portion 17, and cooperate with the other sealing portion to define close clearance.

Preferably, the ring member sealing portion 16a is circumferentially stepped to provide a multiplicity of stepped annular lands 20. Likewise, the diaphragm sealing portion 17 is provided with stepped lands 21 corresponding to the lands 20, a packing or rubbing strip 19 being carried by each of the lands 21 and cooperating with the corresponding land 20. Each of the lands 20 is of substantial radial width with the result that considerable relative radial displacement of the flange and the diaphragm may occur without interfering with effectiveness of the seal.

The sealing portion 16a is carried by structure of the ring member which deflects under the pressure difference existing between opposite sides of the diaphragm to such an extent that the sealing portion 16a moves axially about the same as the axial movement of the sealing portion 17 of the diaphragm on account of deflection of the latter due to the pressure difference, with the result that the sealing clearance is maintained substantially uniform irrespective of variation in the pressure difference so that relatively close clearances may be had under all operating conditions. Accordingly, I show the sealing portion 16a joined by a web 22, to an inner anchor or sleeve portion 23 attached to one or the other of the adjacent discs by means of the groove 23 and caulking strip 24.

Figure 2:
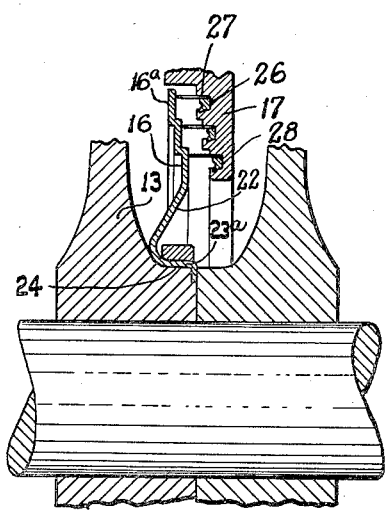
Fig. 2 is a detail view of an alternative form.

Instead of the aforesaid mode of attaching the web, as shown in Fig. 2, the central sleeve portion 23a may telescope over the hub element 24 of a disc 13.

Either construction provides the requisite flexibility to maintain the axial sealing clearance with deflection of the diaphragms. In this connection, it will be observed that the stepped formation of the ring member sealing portion 16a to provide the lands 20 gives a structure which is relatively stiff in all directions, with the result that its conformation and the relation thereof with respect to the diaphragm is maintained, substantially all of the deformation due to differences in pressure occurring in the web 22. Aside from the structural advantage of stiffness afforded by the land formation, it will be noted that the lands provide for a stepped arrangement of the clearances with respect to the packing rings 19, thereby providing a more devious path of flow and consequent greater resistance to leakage, and facility in dismantling and assembling.

It will be apparent that the discs 13 may be formed as integral parts of the rotor or they may be made as separate discs which are secured to a separately formed spindle. If an integral rotor structure is used, it will be obvious that the ring member 16 would have to be split or made in sections so as to permit assembly. On the other hand, where the discs are formed separately from the spindle, the flange or packing may be attached to the rotor as hereinbefore pointed out.

From the foregoing, it will be apparent that I have provided a radial type labyrinth packing for a turbine diaphragm which provides for maintenance of sealing clearance even though radial displacement of the spindle and of the diaphragm may occur. Furthermore, as the rotor-carried packing element is constructed and arranged so that deflection thereof in an axial direction is substantially equal to that of the diaphragm, it will be obvious that close clearances may be maintained under all operating conditions.

The packing rings 19 are comprised by thin metallic strips capable of being readily deformed to fit the grooves within which they are secured. In Figs. 1 and 2, the diaphragm sealing portion 17 is shown as being provided with a plurality of concentric grooves 26 having cylindrical walls 27 against which the sealing strips are pressed by means of the deformable caulking 28 similar to the caulking 25 already described. As the cylindrical surfaces 27 are coaxial with the rotor axis, it will be apparent that the sealing strips extend as cylindrical elements in the direction of the rotor axis toward the sealing portion 16a to define close clearances with respect to the latter. The sealing rings and their means of anchorage are not only mechanically simple, occupy a relatively short distance axially of the rotor, and one which may be easily manufactured and assembled, but also the strips are readily removable whenever required, it being merely necessary to remove the caulking and the old strip, insert a new strip and caulk it in place.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a turbine of the type having diaphragms followed by blade-carrying discs, of interstage packing between each diaphragm and the rotor including a ring member secured to the rotor and having inner annular and outer annular radial portions joined by a web portion, the outer annular radial portion radially overlapping the central portion of the diaphragm, one or more annular packing strips carried by the diaphragm central portion and defining sealing clearance with respect to said outer annular radial portion, said web portion being constructed and arranged so that it deflects under the pressure difference existing between opposite sides of the diaphragm to move the radial portion axially substantially to the same extent that the central portion of the diaphragm moves on account of deflection of the diaphragm due to the pressure difference.

2. In a turbine of the type having diaphragms followed by blade-carrying discs, of packing between each diaphragm and the rotor including a ring member encompassing the rotor and connected thereto, said ring member having an annular sealing portion stepped circumferentially so as to provide a plurality of annular lands, said diaphragm having a central sealing portion which is stepped circumferentially to provide lands opposite to the ring member sealing portion lands, and an annular packing ring carried by each diaphragm sealing portion land and cooperating with the opposite ring member sealing portion land to define sealing clearance, said ring member including a web which is flexible in an axial direction so that deflection thereof due to the difference in pressure existing on opposite sides of the diaphragm results in movement of the ring member sealing portion axially substantially to the same extent as the portion of the diaphragm is moved on account of deflection of the diaphragm due to such pressure difference.

3. In a turbine of the type having diaphragms followed by blade-carrying discs, of packing between each diaphragm and the rotor including a ring member comprising inner sleeve and outer radial portions joined by a curved web portion, the web portion curving outwardly from one end of the sleeve and then backwardly over the sleeve to join the radial portion, the sleeve encompassing the rotor and being secured thereto and the radial portion radially overlapping the central portion of the diaphragm, and one or more annular sealing strips carried by the central portion of the diaphragm and extending axially from the latter to define sealing clearance with respect to said radial portion.

4. In a turbine of the type having diaphragms followed by blade-carrying discs, of packing between each diaphragm and the rotor including a sleeve encompassing the rotor, means for connecting the sleeve to the rotor, a flange which radially overlaps the central annular portion of the diaphragm, a web integral with the sleeve and the flange, said web curving outwardly from one end of the sleeve and then backwardly to join the flange, said flange being formed to provide a multiplicity of stepped annular lands and the central annular portion of the diaphragm having corresponding annular lands, an annular packing strip carried by each of the diaphragm lands and extending axially therefrom to define sealing clearance with the corresponding flange land.

5. In a turbine, a stator, a rotor including a plurality of blade-carrying discs, nozzle-carrying diaphragms arranged between adjacent discs and carried by the stator, each diaphragm having an opening through which the rotor freely extends and provided with an annular radial sealing portion adjacent to the opening, a ring member carried by the rotor between each pair of adjacent discs and including a web portion and an outer annular sealing portion radially overlapping the inner annular sealing portion of the diaphragm, and one or more sealing rings carried by one of the sealing portions and extending toward the other sealing portion to define sealing clearance.

6. In a turbine, a stator, a rotor including a plurality of blade-carrying discs, a nozzle-carrying diaphragm arranged between each pair of adjacent discs, each diaphragm having an opening through which the rotor freely extends and provided with an annular radial sealing portion adjacent to the opening, a ring member carried by the rotor between each pair of adjacent discs and including a web portion and an outer annular sealing portion radially overlapping the inner annular sealing portion of the diaphragm, each diaphragm sealing portion having one or more annular grooves facing in the direction of the ring member sealing portion and each groove having an outer cylindrical wall which is substantially coaxial with the rotor, a sealing strip comprised by relatively thin flexible material fitting against each cylindrical wall and extending toward the sealing portion of the ring member to define sealing clearance with respect thereto, and deformed metallic caulking material in each groove and pressing against each sealing strip to hold the latter in place with respect to its contacting cylindrical wall.

CARL R. SODERBERG.